United States Patent

Mattsson

Patent Number: 5,507,355
Date of Patent: Apr. 16, 1996

[54] CUTTER OF A BORING HEAD, HUB FOR THE CUTTER AND METHOD OF MANUFACTURING SUCH A HUB

[75] Inventor: Michael Mattsson, Sandviken, Sweden

[73] Assignee: Sandvik AB, Sandviken, Sweden

[21] Appl. No.: 244,656

[22] PCT Filed: Nov. 27, 1992

[86] PCT No.: PCT/SE92/00824

§ 371 Date: Jul. 22, 1994

§ 102(e) Date: Jul. 22, 1994

[87] PCT Pub. No.: WO/9312320

PCT Pub. Date: Jun. 24, 1993

[30] Foreign Application Priority Data

Dec. 12, 1991 [SE] Sweden .................................. 9103662

[51] Int. Cl.$^6$ .................................................. E21B 10/12
[52] U.S. Cl. .................................................. 175/371; 29/557
[58] Field of Search .......................... 29/557, 558, 527.2, 29/458; 299/86; 175/371, 372, 373; 384/563, 583

[56] References Cited

U.S. PATENT DOCUMENTS

| | | |
|---|---|---|
| 3,216,513 | 11/1965 | Robbins et al. |
| 3,449,024 | 6/1969 | Lichte |
| 4,255,000 | 3/1981 | Olschewski et al. .................. 308/8.2 |
| 4,509,607 | 4/1985 | Saxman et al. ........................ 175/227 |
| 4,784,438 | 11/1988 | Fikse ........................................ 299/86 |
| 5,181,577 | 1/1993 | Tsukamoto et al. .................. 299/86 X |

*Primary Examiner*—William P. Neuder
*Attorney, Agent, or Firm*—Burns, Doane, Swecker & Mathis

[57] ABSTRACT

The present invention refers to a cutter (10;10') of a boring head, said cutter (10;10') being rotatably mounted, via a shaft (11;11') of the cutter, in a saddle secured to the boring head, a roller bearing means being located between the shaft (11;11') and a hub (18;18'), means (23;23'a,23'b) for axially locking the roller bearing means relative to the shaft (11;11') and sealing arrangements between the hub (18;18') and the locking means (23;23'a,23'b), said roller bearing means including at least one inner race (12;12'a,12'b) that is mounted on the shaft (11;11') and a set of tapered rollers (15;15'a,15'b) mounted in an outer circumferential recess (13;13'a,13'b) of the inner race (12;12'a,12'b), said hub (18;18') being rotatable relative to the shaft (11;11') via said roller bearing means, said rotatable hub (18;18') carrying rock working means (20;20'). The invention also refers to a hub (18;18') per se and a method of manufacturing a hub (18;18').

There is always a need to improve the bearing capacity of cutters of the above-mentioned type. An improved bearing capacity means that higher feeding forces can be applied upon the boring head, said higher feeding force will give an increased penetration rate.

The present invention is characterized by a roller bearing means where outer races (17;17'a,17'b) for the sets of tapered rollers (15;15'a,15'b) are integral with the hub (18;18').

10 Claims, 2 Drawing Sheets

CUTTER OF A BORING HEAD, HUB FOR THE CUTTER AND METHOD OF MANUFACTURING SUCH A HUB

BACKGROUND OF THE INVENTION

1. Field of the Invention

The present invention refers to a cutter of a boring head. This invention deals with cutters both for tunnel boring heads and raise boring heads.

2. Description of Related Art

Prior art roller bearings for cutters of tunnel boring heads, see e.g. U.S. Pat. No. 4,784,438, have usually tapered rollers that are located between an inner and an outer race of the bearing. The circumferential distance between the tapered rollers is controlled by a cage that also is located between the inner and outer races. Since the inner race is stationary, i.e. not rotatable relative to the shaft, said inner race will be subjected to high stresses within a very limited area of its circumference. This means that the inner race will be damaged relatively soon compared to the outer race that rotates relative to the inner race and thus is worn evenly. The consequence of this is that it is favourable to have the inner race as a separate element that is exchangeable when the inner race is worn out. However, there is no need to have the outer race as a separate element since the outer race will normally last for the entire life of the cutter.

The same type of roller bearing is also known for raise boring cutters, see e.g. U.S. Pat. No. 4,509,607. In principle the same disadvantages apply as in a cutter or tunnel boring.

SUMMARY AND OBJECTS

An aim of the present invention is to disclose a cutter that has a considerably increased load bearing capacity and a longer life without demanding more room for the roller bearing. The aim of the present invention is realized by a cutter that has been given the characteristics of the appending claims.

The present invention refers to a cutter of a boring head, said cutter being rotatably mounted, via a shaft of the cutter, in a saddle secured to the boring head, a roller bearing means being located between the shaft and a hub, means for axially locking the roller bearing means relative to the shaft and sealing arrangements between the hub and the locking means, said roller bearing means including at least one inner race that is mounted on the shaft and a set of tapered rollers mounted in an outer circumferential recess of the inner race, said hub being rotatable relative to the shaft via said roller bearing means, said rotatable hub carrying rock working means. The invention also refers to a hub per se and a method of manufacturing a hub.

BRIEF DESCRIPTION OF THE DRAWINGS

Below two embodiments of a cutter according to the present invention are described, reference being made to the accompanying drawings, where.

DETAILED DESCRIPTION OF PREFERRED EMBODIMENTS

Figure 1:
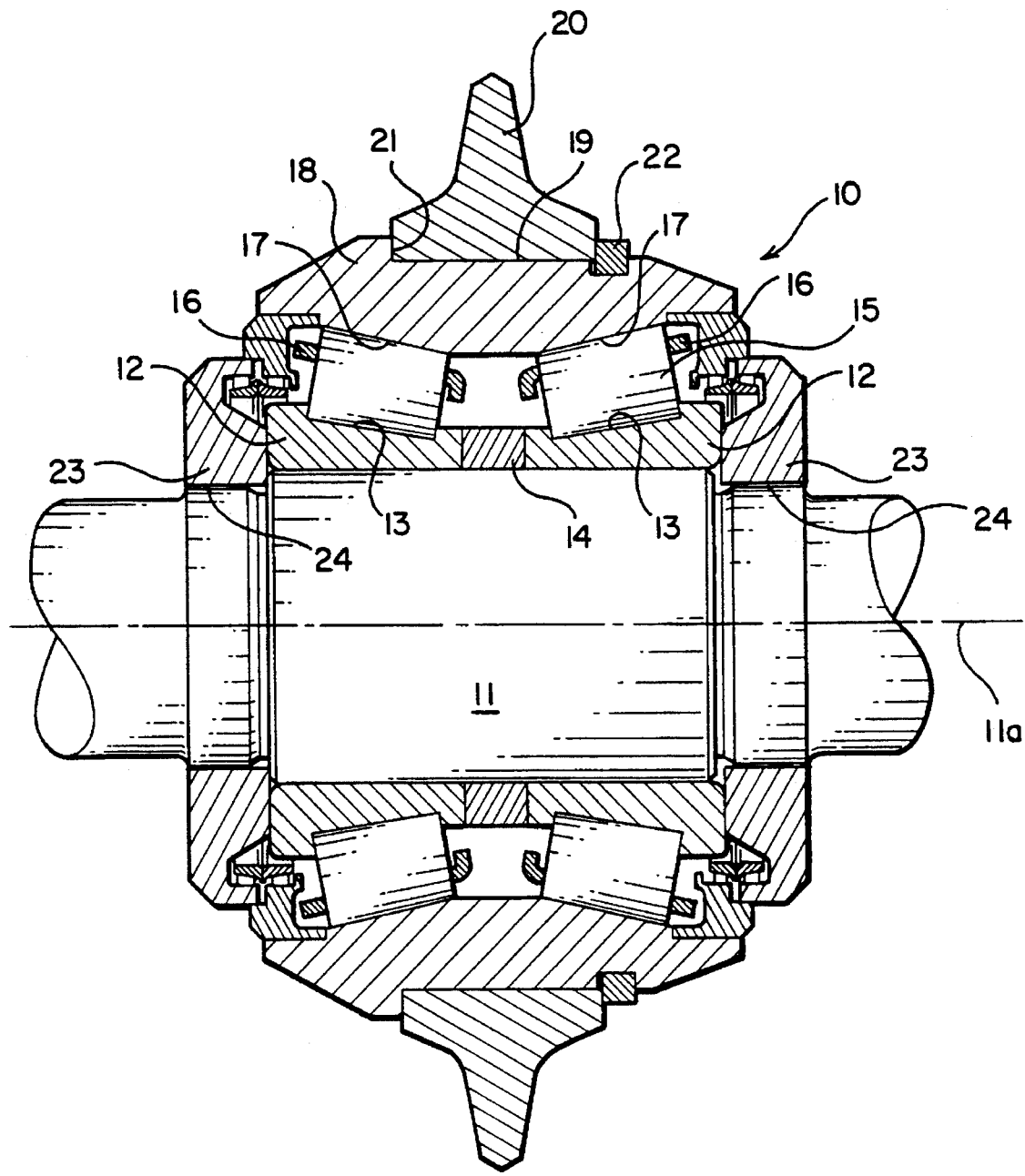
FIG. 1 shows a partially sectioned view of a cutter for tunnel boring according to the present invention.

The cutter 10 in FIG. 1 includes a shaft 11 having a longitudinal centre axis 11a. Said shaft 11 is mounted in a saddle (not shown), said saddle being fixed to the boring head (not shown). Two tapered roller bearings are mounted on the shaft 11. Each bearing includes an inner race 12 that is mounted on the shaft 11 by shrink fit. Along its outer periphery the inner race 12 has a recessed path 13. Between the inner races 12 a distance ring 14 is mounted on the shaft 11.

A set of tapered rollers 15 is mounted in the recessed path 13 of each inner race 12. As is evident from FIG. 1 the tapered rollers 15 have their ends with the smallest diameter directed towards each other.

A cage 16 is mounted outside of each set of tapered rollers 15 to control the circumferential distance between the tapered rollers 15. The inner race 12, the tapered rollers 15 and the cage 16 are normally delivered as assembled bearing units. However, it is also possible that the inner race 12 and the tapered rollers 15 are delivered separately, i.e. the tapered rollers 15 are mounted in-situ in the inner race 12. In such a case it is possible to omit the cage 16.

In order to achieve true rolling the extension of converging generatrices for a tapered roller will intersect each other on the longitudinal centre axis 11a of the shaft 11. This point of intersection is located outside of FIG. 1. The cutter 10 according to the present invention has no separate outer races for the tapered rollers 15 but said outer races 17 are integral with a hub 18, i.e. the outer races 17 are machined directly in the material of the hub 18. In order to adapt to the conicity of the tapered rollers 15 the outer races 17 have an axial extension at a certain angle relative to the longitudinal centre axis 11a of the shaft 11.

The hub 18 is, via the two sets of tapered rollers 15, rotatable relative to the inner races 12 and the shaft 11. The hub 18 has an outer circumferential cylindrical surface 19 that carries a cutting ring 20 that in the disclosed embodiment is made out of steel. However, within the scope of the present invention the cutting ring can be equipped with hard material, preferably cemented carbide inserts or entirely made of cemented carbide. The design and material composition of the cutting ring is not significant for the present invention. The cutting ring 20 is secured on the hub 18 by cooperation between a shoulder 21 on one side of the cylindrical surface 19 and a retaining ring 22 on the other side of the cylindrical surface 19.

In the embodiment of FIG. 1 the inner races 12 and the distance ring 14 are secured in the axial direction of the shaft 11 by end caps 23 that are fixed to the shaft 11 by a thread connection 24. Alternatively the end caps can be fixed to the shaft by screws engaging axial holes in the shaft. Between the hub 18 and the end caps 23 there are sealing arrangements that will not be described in detail since they are not forming a part of the present invention. The material that is used for the hub is preferably a case hardening steel. The manufacture of the hub 18 involves a number of steps. Firstly, the general shape of the hub 18 is created by turning. The portions of the hub 18 that are to be hardened are given their almost finished shape directly in the turning operation while the portions of the hub 18 that are not to be hardened are left with an additional layer having a thickness of a few (ca 5) millimeters. The hub 18 is then subjected to a case hardening treatment including carburizing. When the carburizing is finished the additional layer is taken away by machining (turning). The hub 18 will then be subjected to a heat treatment. This means that the hub will be hardened in the portions that are carburized and not hardened in the portions where the carburizing layer has been taken away. The portions to be hardened are primarily the outer races 17 but it is also favourable to have the cylindrical surface 19 extra hardened since the cutting ring 20 is an exchangeable detail that is worn out several times during the life of a cutter 10. Normally the outer races 17 and the cylindrical surface 19 are subjected to further surface treatment in order to comply with tolerances and other specifications.

As an alternative to leaving an additional layer of a few millimeters on the portions that are not to be hardened said portions can be machined to almost finished shape and covered by a suitable layer that prevents said portions from being carburized. Said layer can e.g. consist of copper or a special paint.

Alternatively the material in the hub can be a through-hardened roller bearing steel. It is also possible to case-harden the entire blank when machined to almost finished shape. Then a hub is achieved having a hardened surface all over.

Since the roller bearings of the cutter in FIG. 1 have no outer races the tapered rollers 15 can, for a given overall space for each bearing, have a larger dimension than for bearings that have outer races, i.e. the tapered rollers 15 can at least partly occupy the space of the deleted outer race and consequently the diameter of the tapered rollers 15 is allowed to increase.

As mentioned in the introductory part of the description the design of the bearing as described above and shown in FIG. 1 will considerably increase the bearing capacity of the cutter compared to a cutter having standard roller bearings, i.e. roller bearings having an outer race in the shape of a separate element. For an average cutter for tunnel boring according to the present invention, said cutter having the same outer diameter as a conventional cutter for tunnel boring, the increase in loading capacity is in the magnitude of 30% without shortening the length of life. If an average cutter for tunnel boring according to the present invention and a conventional cutter are subjected to the same load, the cutter according to the present invention will have a length of life that is about 2.5 times the length of life for a conventional cutter. These estimates are based on ISO 281.

As pointed out above the inner races 12 are usually the details of the roller bearings that are worn out first. When this happens, the end caps 23 and the sealing arrangements are removed and normally the assembled bearing units that each includes the inner race 12, the tapered rollers 15 and the cage 16 are dismounted and replaced by new bearing units. Thereafter, the sealing arrangements and the end caps 23 are remounted.

Figure 2:
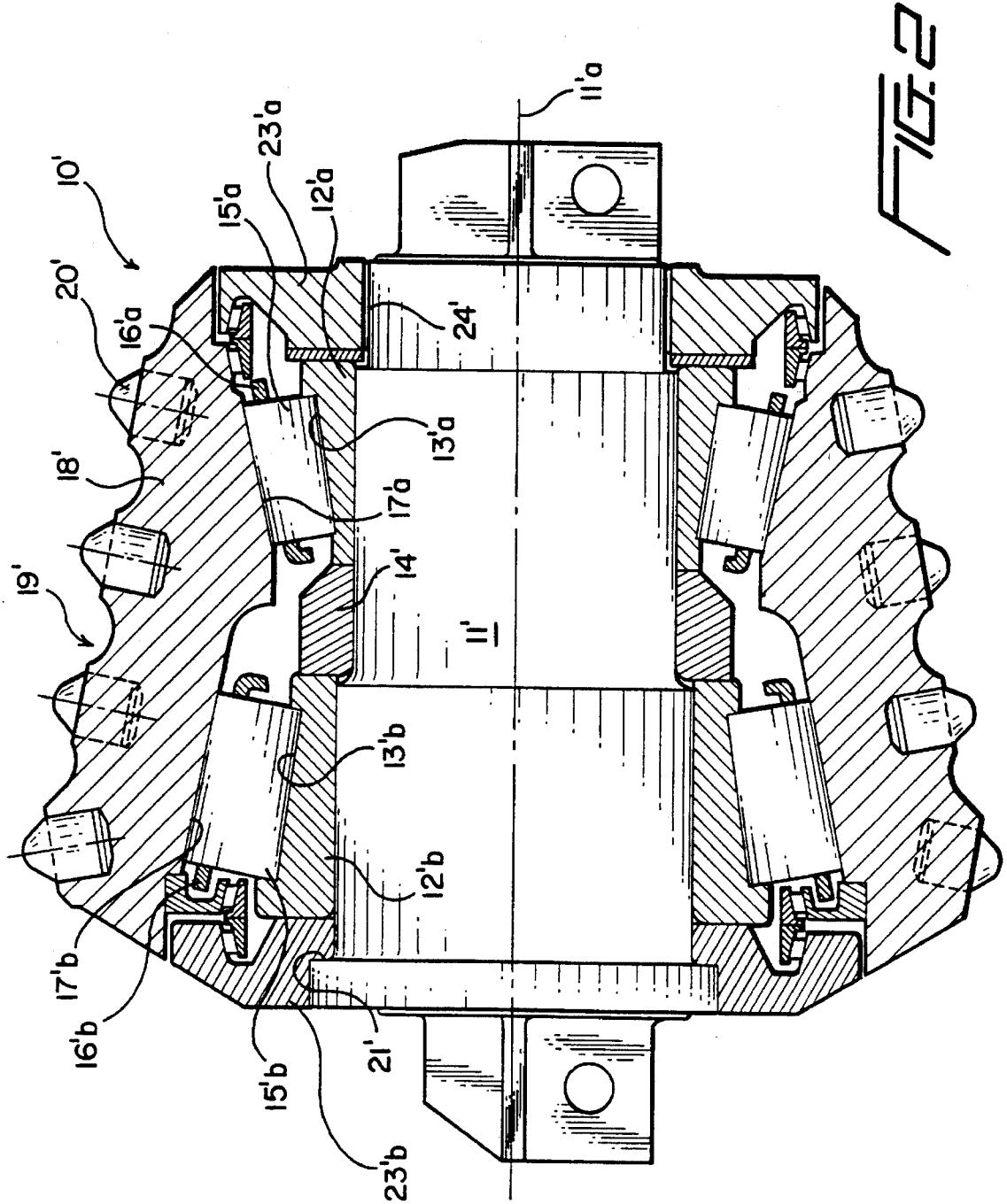
FIG. 2 shows a partially sectioned view of a cutter for raise boring according to the present invention.

The cutter 10' in FIG. 2 includes a shaft 11' having a longitudinal centre axis 11'a. Said shaft 11' is mounted in a saddle (not shown), said saddle being fixed to the boring head (not shown). Two tapered roller bearings of different size are mounted on the shaft 11'. Each bearing includes an inner race 12'a, 12'b that is mounted on the shaft 11' by shrink fit. Along its outer periphery the inner race 12'a, 12'b has a recessed path 13'a, 13'b. Between the inner races 12'a and 12'b a distance ring 14' is mounted on the shaft 11'.

A set of tapered rollers 15'a, 15'b is mounted in the recessed path 13'a, 13'b of each inner race 12'a, 12'b. Since the cutter 10' has a general conical shape the tapered rollers 15'a and 15'b are of different size, the tapered rollers 15'a having in general a smaller diameter than the tapered rollers 15'b. The smaller tapered rollers 15'a are located at the end of the cutter 10' having the smaller diameter. As is evident from FIG. 2 the tapered rollers 15'a, 15'b have their ends with the smallest diameter directed towards each other.

A cage 16'a, 16'b is mounted outside of each set of tapered rollers 15'a, 15'b to control the circumferential distance between the tapered rollers 15'a, 15'b. The inner race 12'a, 12'b, the set of tapered rollers 15'a, 15'b and the cage 16'a, 16'b are normally delivered as assembled bearing units. However, it is also possible that the inner race 12'a,12'b and the tapered rollers 15'a,15'b, resp. are delivered separately, i.e. the tapered rollers 15'a,15'b are mounted in-situ in the inner race 12'a,12'b, resp. In such a case it is possible to omit the cage 16'a,16'b.

In order to achieve true rolling the extension of converging generatrices for a tapered roller will intersect each other on the longitudinal centre axis 11'a of the shaft 11'. This point of intersection is located outside of FIG. 2. The cutter 10' according to the present invention has no separate outer races for the tapered rollers 15'a, 15'b but said outer races 17'a, 17'a are integral with a hub 18', i.e. the outer races 17'a, 17'a are machined directly in the material of the hub 18'. In order to adapt to the conicity of the tapered rollers 15'a, 15'b the outer races 17'a, 17'b have an axial extension at a certain angle relative to the longitudinal centre axis 11'a of the shaft 11'.

The hub 18' is, via the two sets of tapered rollers 15'a, 15'b, rotatable relative to the inner races 12'a, 12'b and the shaft 11'. The hub 18' has a generally frusto-conical envelope surface 19' that carries a number of button inserts 20', preferably made of cemented carbide. The inner races 12'a, 12'b and the distance ring 14' are secured in the axial direction of the shaft 11 by end caps 23'a and 23'b. The end cap 23'b is cooperating with a shoulder 21' of the shaft 11' in order to fix the end cap 23'b against axial displacement to the left in FIG. 2. The other end cap 23'a is fixed to the shaft by a thread connection 24'. Between the hub 18' and the end caps 23'a and 23'b there are sealing arrangements that are not described in detail since they are not forming a part of the present invention.

The material and manufacture of the hub 18' corresponds to what has been stated above concerning the hub 18. Therefore, in that respect reference is made to relevant passages above in the description.

The principles of achieving an increased loading capacity in accordance with the present invention are the same for a raise boring cutter, as exemplified in FIG. 2, as for a tunnel boring cutter, as exemplified in FIG. 1. Therefore, in that respect reference is made to relevant passages above in the description.

The principles of removing worn out bearing units and replace them by new ones are the same for a raise boring cutter, exemplified in FIG. 2, as for a tunnel boring cutter, exemplified in FIG. 1. Therefore, in that respect reference is made to relevant passages above in the description.

It should be pointed out that especially with respect to cutters for raise boring it is possible within the scope of the present invention to design only one of the bearing units in accordance with the present invention.

Also in other respects the present invention can be varied freely within the scope of the appending claims.

I claim:

1. A cutter of a boring head, said cutter being rotatably mounted, via a shaft of the cutter, in a saddle secured to the boring head, comprising:

a roller bearing means being located between the shaft and a hub, means for axially locking the roller bearing means relative to the shaft, sealing arrangements between the hub and the locking means, said roller bearing means including at least one inner race that is mounted on the shaft and a set of tapered rollers mounted in an outer circumferential recess of the inner race, said hub being rotatable relative to the shaft via said roller bearing means, said rotatable hub carrying rock working means, an outer race for the set of tapered rollers of the roller bearing means is integral with the hub, said outer race has an axial extension at a certain angle relative to a longitudinal center axis of the shaft, said angle being so oriented that an axially inner portion of said outer race is located more close to the longitudinal center axis of the shaft than an axially outer portion of said outer race.

2. Cutter according to claim 1, wherein the roller bearing means of said cuter has two inner races and two sets of tapered roller, and there are two outer races that are integral with the hub.

3. Cutter according to claim 1, wherein the outer race is hardened.

4. A hub for a cutter of a boring head, said cutter being rotatably mounted, via a shaft of the cutter, in a saddle secured to the boring head, said hub, comprising:

a roller bearing means, at least one outer race for a set of tapered rollers of the roller bearing means, said outer race being integral with the hub, said outer race having an axial extension at a certain angle relative to a longitudinal center axis of the shaft, said angle being so oriented that an axially inner portion of said outer race is located more closely to the longitudinal center axis of the shaft than an axially outer portion of said outer race.

5. Hub according to claim 4, wherein the hub has two outer races that are integral with the hub.

6. Hub according to claim 4, wherein the outer race is hardened.

7. A method of manufacturing a hub for a cutter of a boring head, said cutter being rotabably mounted, via a shaft of the cutter, in a saddle secured to the boring head, said hub being rotatable relative to the shaft via a roller bearing means, comprising the steps of:

creating a blank of the hub by suitable machining, machining portions of the hub that are to be hardened to an almost finished shape while portions of the hub that are not to be hardened are left with an additional layer of a few millimeters, subjecting the blank to carburizing, again machining the blank to remove the additional layer, heat-treating the blank in order to harden the portions having the almost finished shaped, and subjecting the outer races to further surface treatment in order to comply with tolerances.

8. A method of manufacturing a hub for a cutter of a boring head, said cutter being rotatably mounted, via a shaft of the cutter, in a saddle secured to the boring head, said hub being rotatable relative to the shaft via a roller bearing means, comprising the steps of:

creating a blank of the hub by suitable machining, machining the hub to an almost finished shape, applying a layer that prevents carburization to portions of the hub that are not to be hardened, subjecting the blank to carburizing, heat-treating the blank in order to harden the portions that are not having a layer to protect against carburization, and subjecting the outer races to further surface treatment in order to comply with tolerances.

9. A hub for a cutter of a boring head, said cutter being rotatably mounted, via a shaft of the cutter, in a saddle secured to the boring head, said hub, comprising:

a hub body, roller bearing means, at least one outer race for a set of tapered rollers of the roller bearing means, carrying means for carrying a cutter on an outer circumferential surface of the hub body, said outer race being integral with the hub body, said outer race having an axial extension at a certain angle relative to a longitudinal center axis of the shaft, said angle being so oriented that an axially inner portion of said outer race is located more closely to the longitudinal center axis of the shaft than an axially outer portion of said outer race.

10. Hub according to claim 9, wherein the carrying means comprises an outer circumferential cylindrical surface and a retaining ring.

* * * * *